United States Patent [19]
Kim

[11] Patent Number: 5,673,369
[45] Date of Patent: Sep. 30, 1997

[54] AUTHORING KNOWLEDGE-BASED SYSTEMS USING INTERACTIVE DIRECTED GRAPHS

[75] Inventor: Michelle Yoonkyung Kim, Scarsdale, N.Y.

[73] Assignee: International Business Machines Corporation, Armonk, N.Y.

[21] Appl. No.: 396,823

[22] Filed: Mar. 2, 1995

[51] Int. Cl.[6] .................................................. G06F 17/00
[52] U.S. Cl. ................................................ 395/75; 395/76
[58] Field of Search ................................ 395/75, 22, 20, 395/12, 76, 50, 60

[56] References Cited

U.S. PATENT DOCUMENTS

| | | | |
|---|---|---|---|
| 4,803,641 | 2/1989 | Hardy et al. | 395/76 |
| 4,839,822 | 6/1989 | Dormond et al. | 395/52 |
| 4,891,766 | 1/1990 | Derr et al. | 395/76 |
| 5,002,491 | 3/1991 | Abrahamson et al. | 434/322 |
| 5,208,745 | 5/1993 | Quentin et al. | 364/188 |
| 5,299,121 | 3/1994 | Brill et al. | 364/413.01 |
| 5,303,042 | 4/1994 | Lewis et al. | 348/14 |
| 5,379,057 | 1/1995 | Clough et al. | 345/173 |

OTHER PUBLICATIONS

Rich and Knight, "Artificial Intelligence," McGraw-Hill, Chapter 8 Dec. 1991.

*Primary Examiner*—Tariq R. Hafiz
*Assistant Examiner*—Ji-Yong D. Chung
*Attorney, Agent, or Firm*—Whitham, Curtis, Whitham & McGinn; Louis J. Percello

[57] ABSTRACT

A knowledge based computing system is authored using a directed graph presented to the author at an authoring time. The directed graph has one or more question nodes and one or more answer nodes. The question nodes and the answer nodes connected to one another on one or more paths by links between each of the question nodes and each of the answer nodes so that question nodes and answer nodes alternate as the path is traversed in a path direction so that a "QA directed graph" is created. Each question node associated with a question data structure and each answer node associated with a answer data structure that are populated with information accessed from the author using question and answer templates associated with respective question and answer nodes on the QA directed graph. After the expert system is created (authored) using the QA directed graph it can be run at a run time to provide and access information from a service user. The system has many applications particularly in the health care and teaching fields.

22 Claims, 14 Drawing Sheets

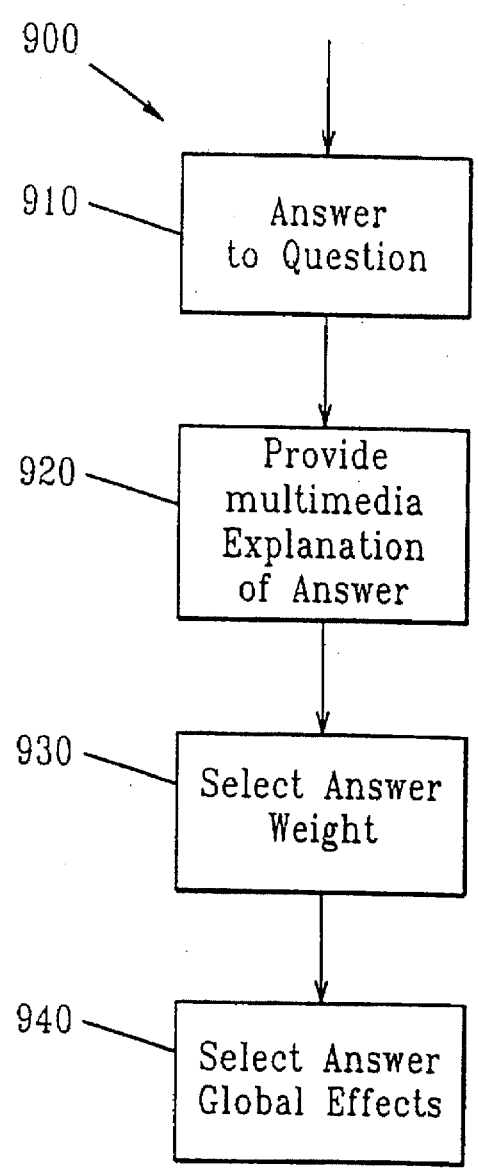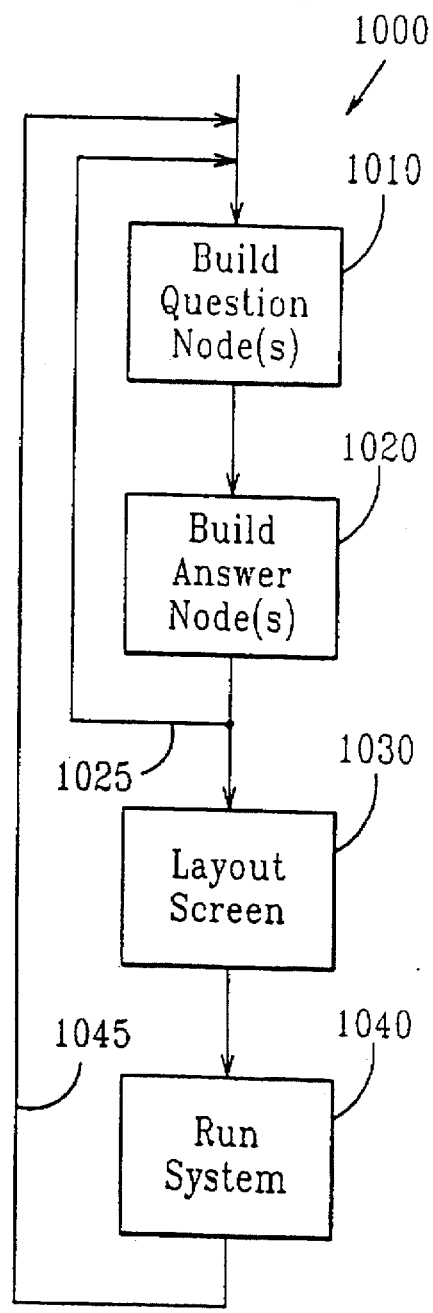

AUTHORING KNOWLEDGE-BASED SYSTEMS USING INTERACTIVE DIRECTED GRAPHS

FIELD OF THE INVENTION

This invention relates to the field of artificially intelligent computer systems. More specifically, the invention relates to building knowledge-based systems using software objects especially in multimedia applications.

BACKGROUND OF THE INVENTION

When building a knowledge-based system, or expert system, at least two disciplines are needed to build a "knowledge base"—the discipline of the "domain expert" and the discipline of the "knowledge engineer". The domain expert has knowledge of the domain or field of use of the expert system. For example, the domain expert of an expert system used in the medical field or domain might be a doctor or nurse while the domain expert of an expert system used in the legal field might be a lawyer or judge. The knowledge engineer is a person that understands the expert system and uses the domain knowledge to create an application for the system. In many instances, the knowledge engineer and domain expert are separate people who have to collaborate to build the expert system.

Typically this collaboration takes the form of the knowledge engineer asking questions of the domain expert and incorporating the answers to these questions into the design of the system. This approach is labor intensive, slow, and error prone. There are two people (or two groups of people) that also have to be coordinated. Although the knowledge engineer can transcribe input from the domain expert from videotape, audio tape, text and other sources, efforts from people of both disciplines have to be expended. Further, if the knowledge engineer doesn't ask the domain expert the correct questions or asks the questions in an incorrect way, the information used to design the knowledge base of the expert system could be incorrect.

Another disadvantage of the prior art is that domain experts do not get immediate feedback for the expert system while they are creating and maintaining the knowledge base. With conventional approaches, there is a time-consuming feedback loop that ties together various processes from knowledge-acquisition to validation.

OBJECTS OF THE INVENTION

An object of this invention is an improved system and method for building knowledge based systems.

An object of this invention is an improved system and method that enables a domain expert, or author, to build a knowledge base system without the use of a knowledge engineer.

Another object of this invention is an improved system and method that enables the building of knowledge based systems using software objects, especially multimedia objects.

Another object of this invention is an improved system and method that immediately displays the effects of design changes done by an author during the building of a knowledge based system.

Another object of this invention is an application of an improved expert system and method to a home health care system.

SUMMARY OF THE INVENTION

The present invention is a system and method for authoring a knowledge based computing system using a computer with a memory storage and a graphical interface, a knowledge base having information about an application to be authored on the computing system by an author, and a novel directed graph presented to the author at an authoring time. The invention enables an author with domain knowledge but little knowledge of expert systems to effectively build a knowledge base and expert system, in particular an expert system that uses multimedia displays to convey and access information to a service user at a run time. The directed graph has one or more question nodes and one or more answer nodes. The question nodes and the answer nodes connected to one another on one or more paths by links between each of the question nodes and each of the answer nodes so that question nodes and answer nodes alternate as the path is traversed in a path direction as the "QA directed graph" is created or authored. Each question node is associated with a question data structure and each answer node is associated with a answer data structure that are populated with information accessed from the author using question and answer templates associated with respective question and answer nodes on the QA directed graph. After the expert system is created (authored) using the QA directed graph it can be run at a run time to provide and access information from a service user. The system has many applications particularly in the health care and teaching fields.

BRIEF DESCRIPTION OF THE DRAWINGS

FIG. 3, comprising

FIG. 9 is a flow chart showing the steps of building an answer template data structure.

FIG. 10 is a flow chart showing the steps of building a knowledge based system using the built question and answer data structures.

DETAILED DESCRIPTION OF THE INVENTION

Figure 1:
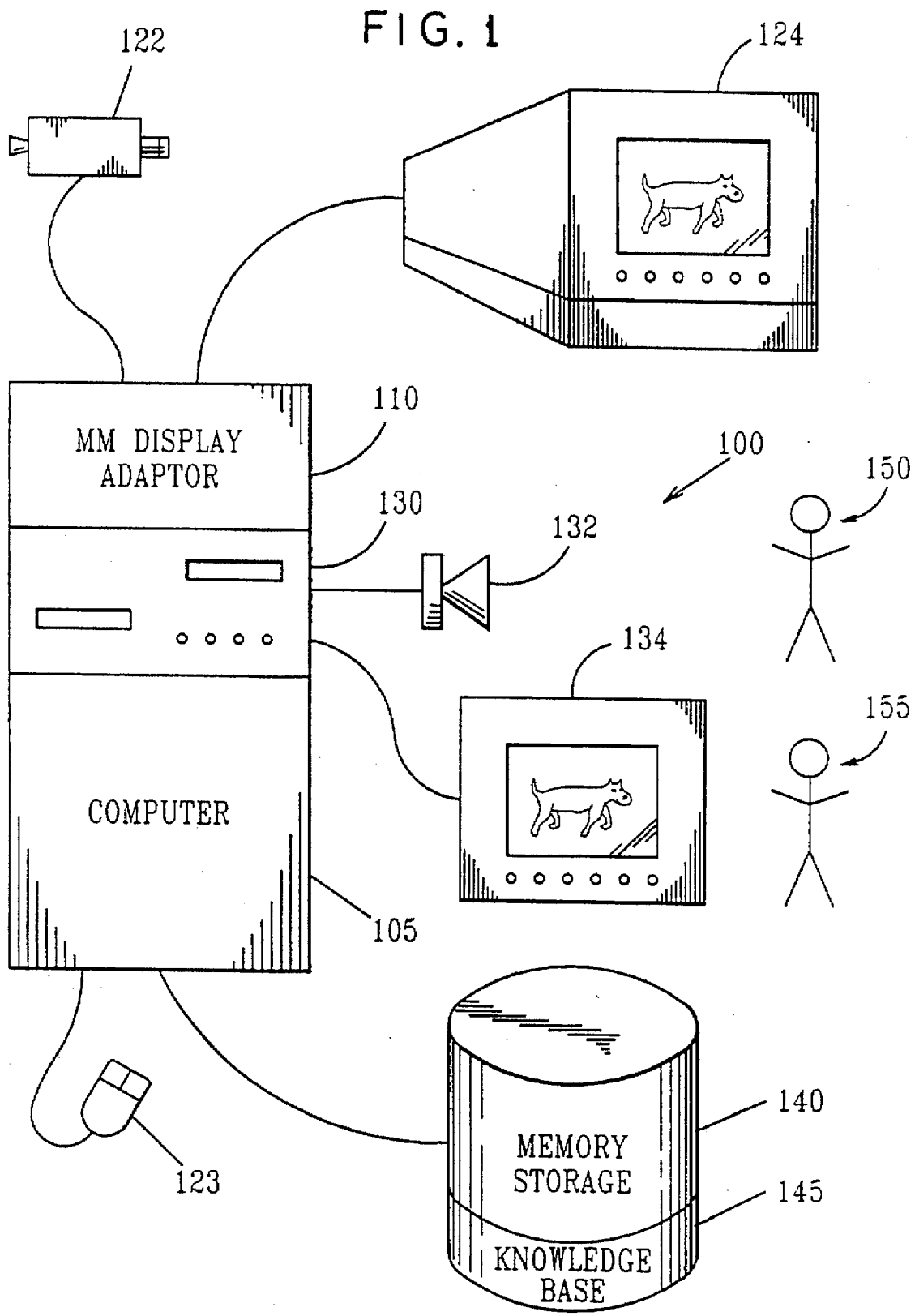
FIG. 1 is a block diagram of the hardware of one preferred embodiment of the present invention.

The present invention is capable of running on any general purpose computer system preferably one which has the ability to present multimedia information to a user 150. One preferred embodiment 100, that is shown as a block diagram in FIG. 1, uses an IBM Personal System/2 (PS/2) Model 8595 Microchannel Floor Standing 486 System 105 (described in the Quick Reference supplied with the system unit). An IBM Personal System/2 (PS/2) ActionMediaII Display Adapter 110 (described in the ActionMedia II Technical Reference) is used for audio/video capture 122 and playback, for example on a graphical interface 124. This preferred embodiment also uses an IBM Operating System/2 (OS/2) 2.0 (described in the OS/2 2.0 Quick Reference), an IBM Multimedia Presentation Manager/2 (described in the IBM Multimedia Presentation Manager/2 ActionMedia (R) II Media Control Interface Programming Guide and Reference), and a Smalltalk/VPM (described in the Smalltalk/VPM Tutorial and Programming Handbook). Other multimedia hardware 130 known in the art that can be connected to a general purpose computer can also be used. This hardware 130 may include video cassette recording devices, laser disc player adapters, audio capture playback adapters, etc. The marks OS/2 and PS/2 are trademarks of the IBM Corporation, and the mark Smalltalk/VPM is a trademark of Digitalk, Inc..

Any memory storage apparatus 140 well known in the art operates with the computer system 100. A knowledge base 145 resides on the memory storage 140. The knowledge base 145 contains domain specific data/information that can be used by an author 150 at an "authoring time" to create an application on the system 100. The knowledge base 145 also has information that will be used by the system to answer questions posed at a "run time" by a service user 155 (e.g. a patient). Examples of domain specific data/information in the medical area might include information about how to perform a medical procedure or information about symptoms of a medical condition. In the preferred embodiment, some of the information in the knowledge base 145 includes multimedia information (objects).

The present invention allows the users 150 also called domain experts 150 or authors 150, to capture their knowledge about the domain as a set of questions and answers, and to validate the resulting knowledge-base in an immediate feedback loop. The invention also allows the domain experts/authors 150 to design their own screen layout and experiment with different user interfaces in the same feedback loop. These functions are performed by the authors 150 at the authoring time.

The present invention also provides a novel environment for experts (or authors) 150 to annotate their questions and answers with multimedia comments. At authoring time, the author 150 can create in the multimedia authoring environment various multimedia documents such as talking story books, interactive music video, or simple text fragments to go with the corresponding question or the answer. The system 100 created by the author 150 at authoring time is used by the service user 155 at run time. In one preferred embodiment, the author 150 is a health care professional, such as a doctor, nurse, psychiatrist, etc. that uses the present invention at authoring time to create a multimedia application used by the service user 155 requiring health care information provided by the system at a run-time. In alternative embodiments, the user/author 150 at authoring time might be a teacher or trainer 150 that creates a multimedia application on the system 100 to be used by a student 155 at run-time. Other applications are within the contemplation of the invention.

Figure 2:
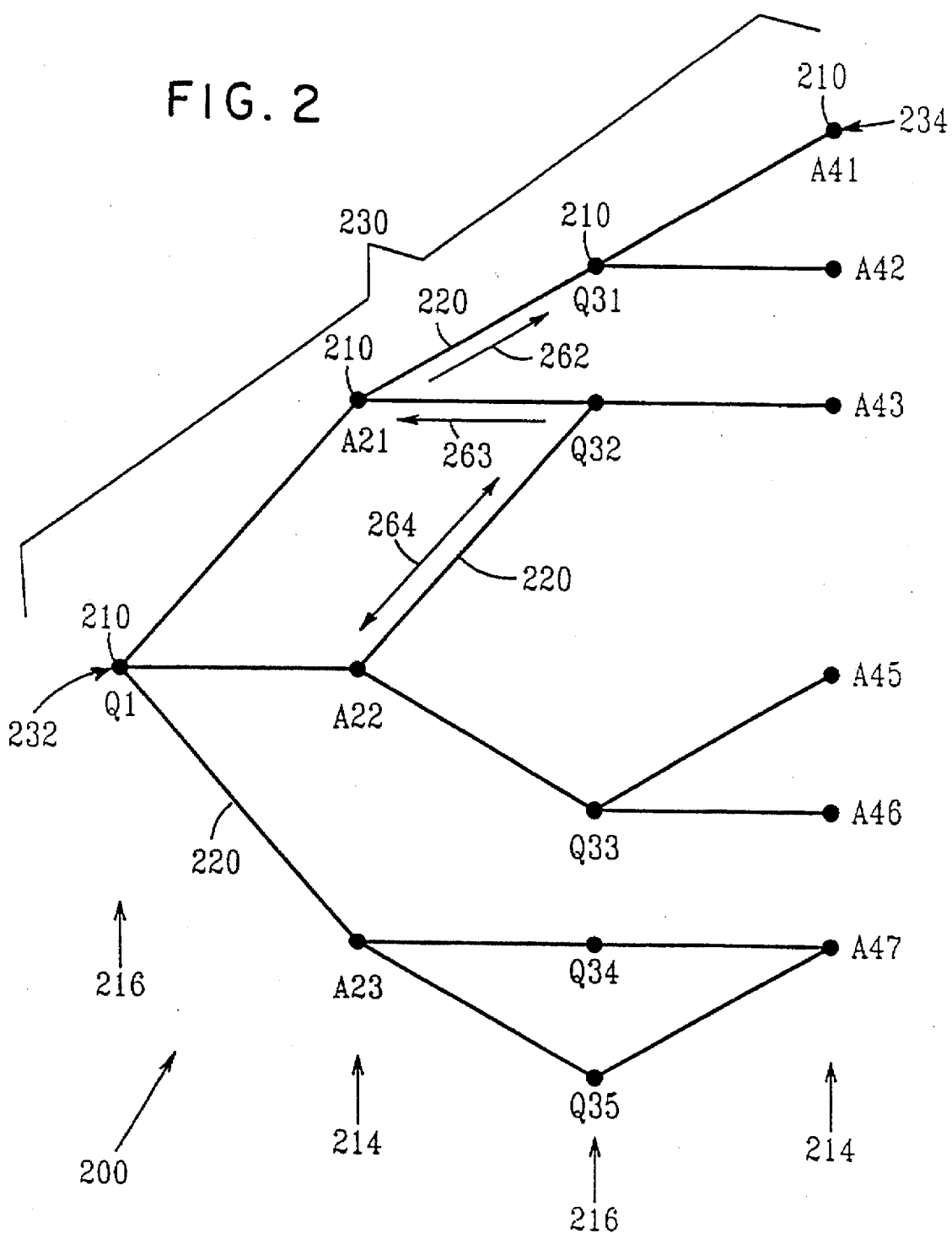
FIG. 2 is a drawing of a novel directed graph with alternating question and answer nodes in a given path, in a preferred embodiment, the nodes being template objects.

FIG. 2 is a drawing showing one novel feature of the present invention, an interactive directed graph 200. This directed graph 200 comprises a set of nodes, typically 210. There are two types of these nodes 210, answer nodes (typically 214) and question nodes (typically 216). Links or edges (typically 220) connect one node 210 to another node (or nodes) 210 in a sequence of connected nodes 210 so that a path 230 is created from a starting node (e.g. typically 232) along the connected nodes to an ending node (e.g. typically 234). For instance, a path 230 would begin at start node (question node 216), Q1, go through path nodes A21 (answer node 214) and Q31 (question node 216) and terminate and an end node A41 (answer node 214). A start node 232 can be chosen any where in the directed graph and end node 234 can be any node in the graph that is on a path starting at the starting node 232.

The directed graph is constructed so that as a path 230 is traversed from a start node (typically 232) to an end node (typically 234), the nodes that lie on the path alternate in type. That is, an answer node 214 can only connect to one or more question nodes 216 and visa versa. This novel type of directed graph is called a QA directed graph.

A link or edge 220 is directional (e.g. 262–64). More specifically, an edge 220 is unidirectional (e.g. 262, 263) if it directs 262 (263) the flow from an answer 214 (question 216) node to a question 216 (answer 214) node or bidirectional 264 if it directs the flow to or from an answer node 214 and a question node 216.

The QA directed graph 200 is created interactively by the author 150 at authoring time on a graphical interface 124 in order to create the application on the system 100. The graph 200 is created using graphical user interface commonly known functions like add (create), delete (remove), and so on. These functions are provided in the Smalltalk programming environment. Use of these functions enable the QA directed graph to be created and maintained interactively in that the effect on the graph 200 of adding or removing nodes 210 and edges (links) 220 is immediately displayed to the author. Other known functions can be used. These include merge and split: merge can be used to create hierarchical relationships between nodes, and split to undo the existing relationship separating the connected nodes. In this manner at authoring time, the author 150 can interactively create and maintain (or modify) the nodes 210 and the QA directed graph 200 that define the system 100. In a preferred embodiment, a node 210 can visually represented, in a novel way, as a template on the graphical interface 134 (shown in FIG. 1.) (For example, by clicking on the node 210 with a mouse key at authoring time, the template associated with the node is presented to the author 150.) Question nodes 216 are represented by question templates (described in FIGS. 4–6) and answer nodes 214 are represented by answer templates (described in FIGS. 7–9). In a preferred embodiment, a template is an interactive user/author interface that is defined by a software object.

Figure 3A:
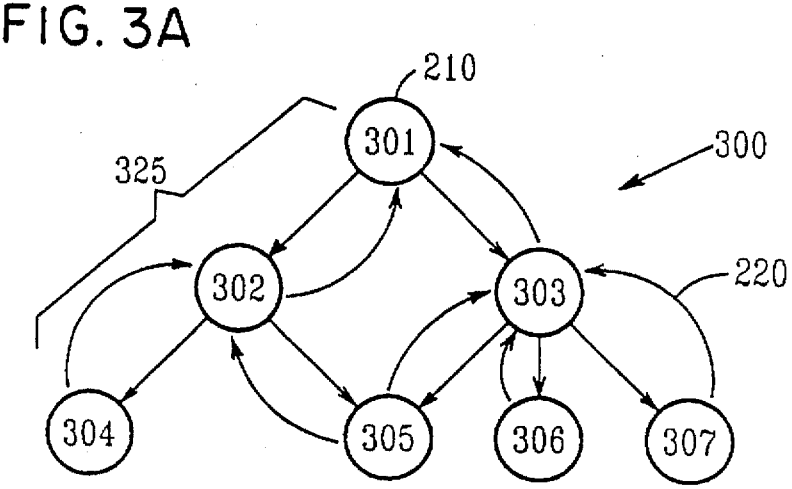
FIGS. 3A and 3B, is a drawing showing an example of a novel QA directed graph (FIG. 3A) and a preferred data structure (FIG. 3B) that defines the QA directed graph.
Figure 3B:
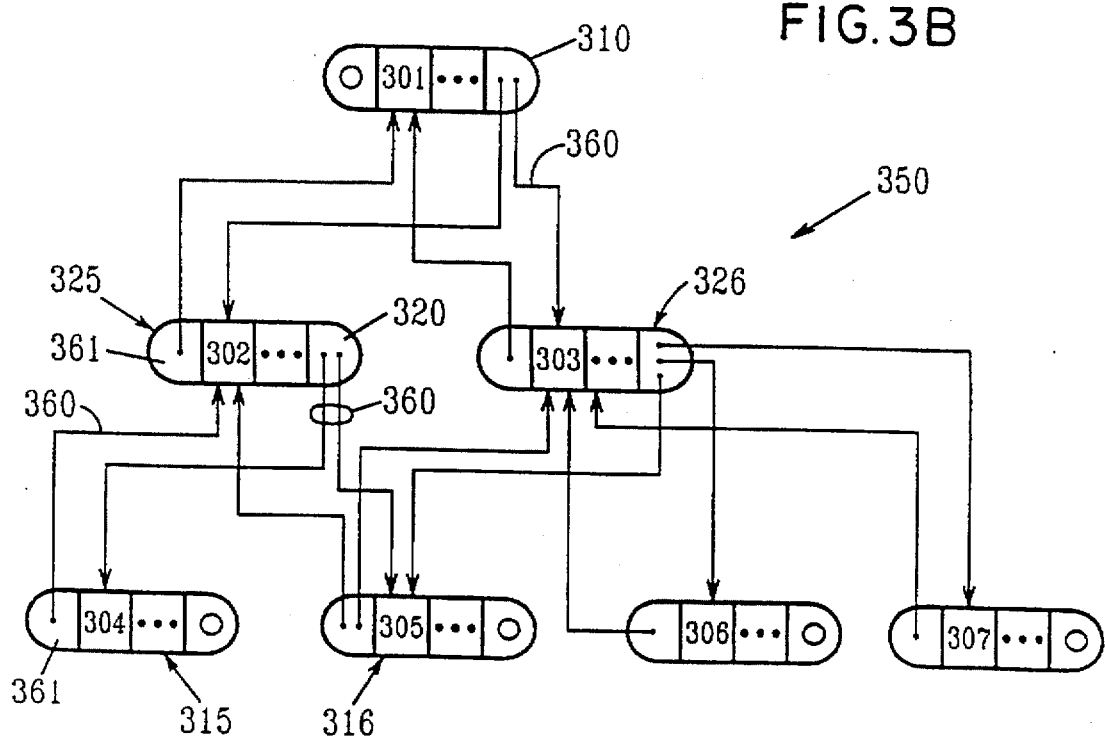

FIG. 3 shows an example QA directed graph 300 (FIG. 3A) and a block diagram of a QA data structure 350 (FIG. 3B) that defines the QA directed graph 300.

The graph 300 has the same structure as the QA directed graph described in FIG. 2. Specifically, the QA directed graph 300 has nodes that novelly represent templates. The nodes (301–307, typically 210) lie on paths in the graph that are connected by directional links (typically 220). In this example, all the links 220 are bidirectional. As in FIG. 2, question and answer nodes (templates) alternate as a progression is made along any path (typically 325).

The QA data structure 350 comprises a node data set (typically 310) that corresponds to each node 210. The node data sets are referenced to each other by pointers (typically 360.) There is a field 320 (see FIGS. 5 and 8) in a node data set, typically 325, which has pointers to all the node data set's children (e.g. 315, 316), and a field 361 (see FIGS. 5 and 8) in the data set of each child (e.g. 315,316) that has pointers 360 to all its parents (e.g. 325, 326). (Children nodes are nodes in a path connected to a parent node by a link 220. Children nodes lie closer to the end node of the path than the parent.) For example, the author 150 could create the graph by creating Node 325. Initially both the parent field and the child field in node 325 are set to nil. When the author creates another node such as Node 315 and connects it to Node 325 as its child node, the child field 320 in Node 325 is set with a pointer 360 to point to Node 315, and the parent field 361 in Node 315 is set with a pointer 360 to point to its parent Node 325, establishing a parent-child relationship between the two nodes 325-315. In a similar way, a parent-child relationship can be set up between node 326 and one or more 316 other nodes.

Other information is included in the node data set 301 (typically 310). The description of each field containing this information is given below in FIG. 5, for question nodes, and in FIG. 8, for answer nodes.

Once the author 150 has defined a QA directed graph 200 by defining the nodes parents and children (if any), the author 150 can display the QA directed graph 200 on the user interface 124. The author 150 can then selected, for example by using a mouse 123 click, the question 216 and answer 214 nodes of the QA directed graph 200 one at a time. In one preferred embodiment, when a question 216 or answer 214 node is selected, a respective question or answer template appears on the user interface 124.

Figure 4:
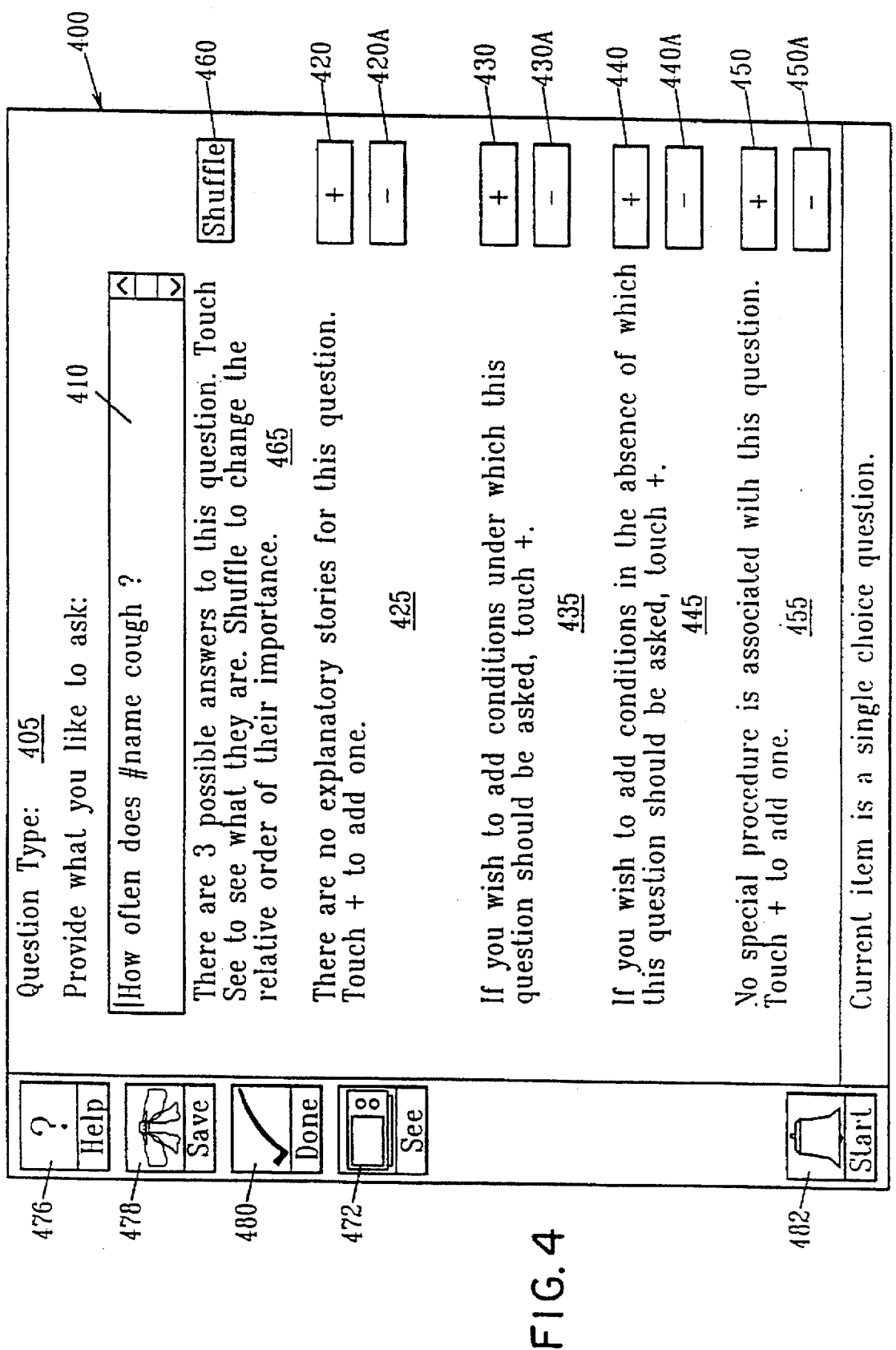
FIG. 4 is a drawing showing one preferred question template.
Figure 5:
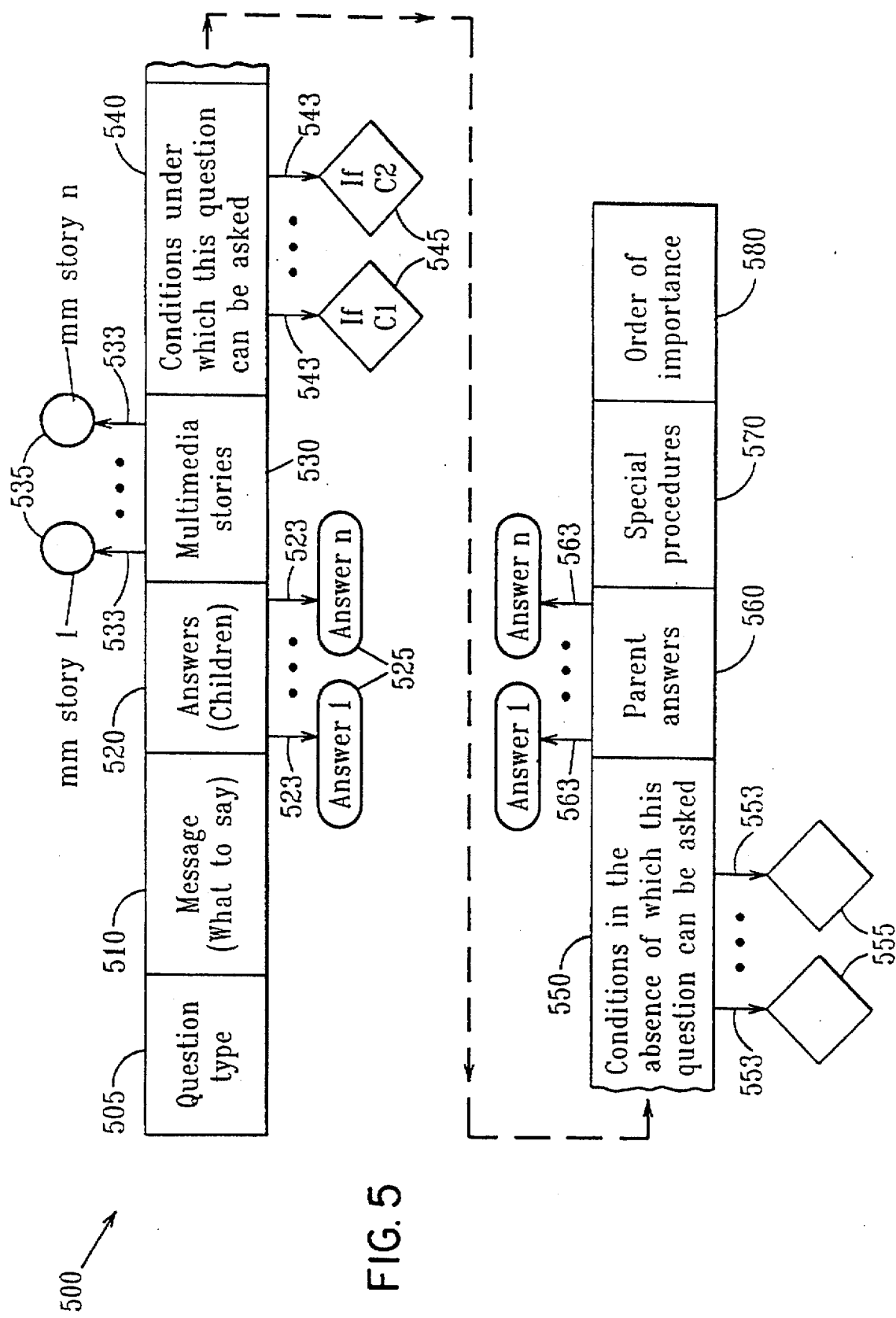
FIG. 5 is a block diagram of a preferred question template data structure.
Figure 7:
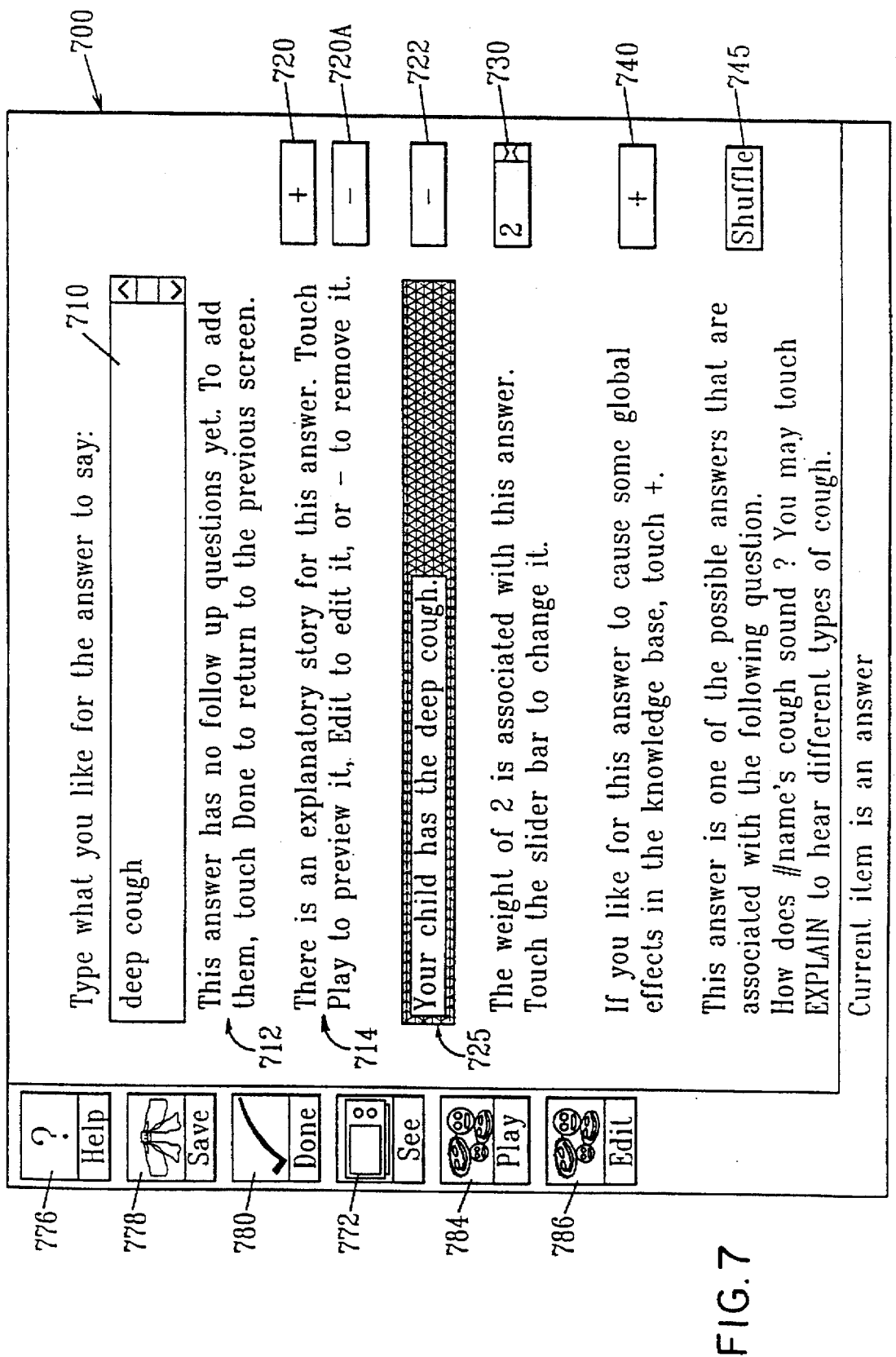
FIG. 7 is a drawing of one preferred answer template.
Figure 8:
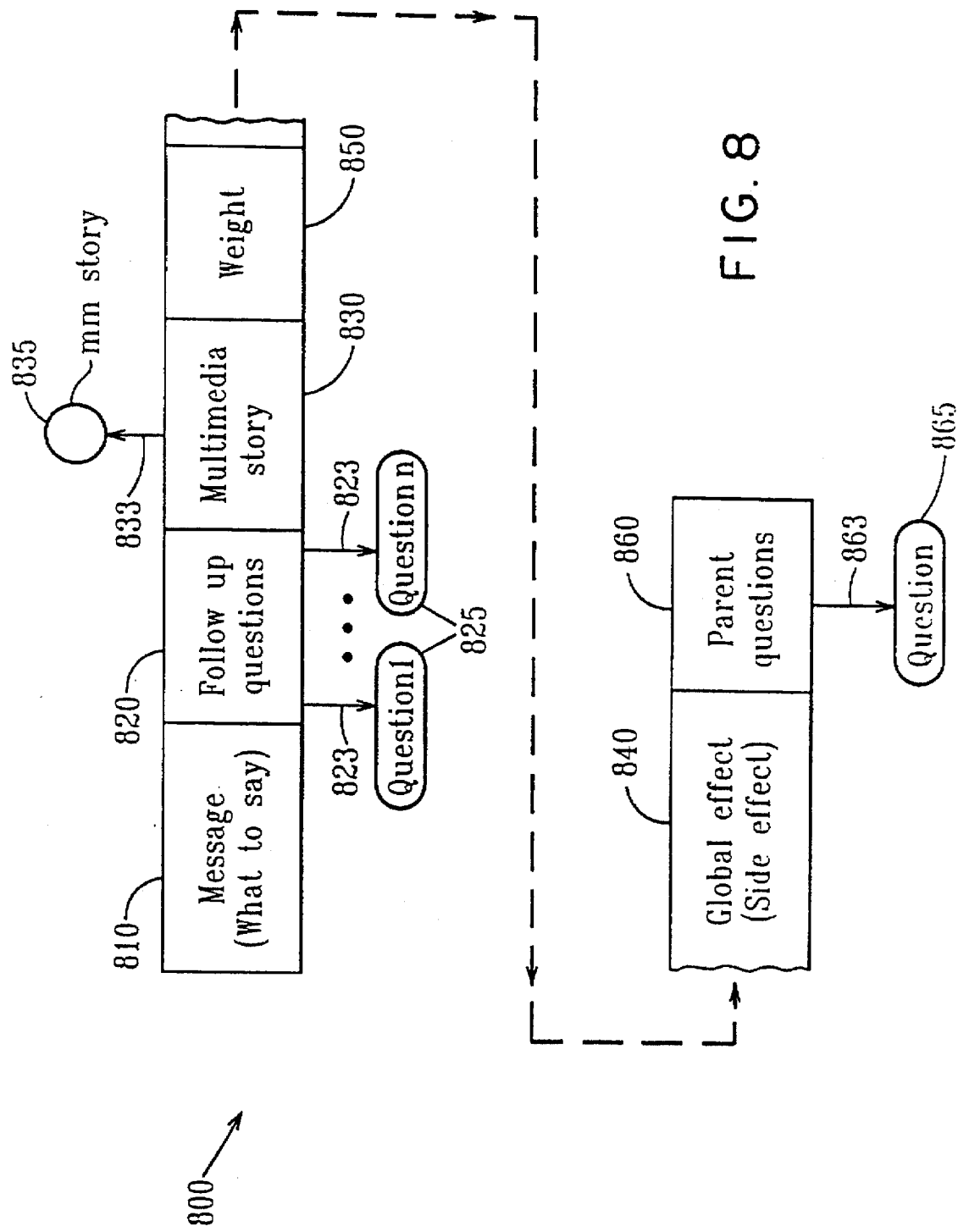
FIG. 8 is a block diagram showing a preferred data structure for an answer template.

The author 150 uses the templates to insert, delete, or modify information in the fields of the data set 310 of the selected node 210. The author does this by using the tools of the template described below (FIGS. 4 and 7). Initially, the node is represented by a template that is almost empty. The author 150 adds (or deletes) information on the template which causes a data set 310 associated with the node/template to be updated (FIGS. 5 and 8). This can be done with a standard edit function.

FIG. 4 is a drawing showing one preferred embodiment of a question template 400 that is rendered on the graphical interface 124. The template represents any typical question node 216 on the QA directed graph 200. The template 400 is an object, more preferably in an object oriented environment, the template is an object oriented object. The template may contain other objects like multimedia objects. At authoring time, the author 150 may use the graphical user interface 124 to fill out the template, i.e., add, delete, or modify the data set 310 associated with the selected node 210. In a preferred embodiment, the data that is entered would include an appropriate multimedia object or a pointer to the multimedia object. This multimedia object might reside in the knowledge base 145. When this happens, the information necessary to find the multimedia object will be placed in the data structure for the template, e.g. the multimedia stories field 530 in described in FIG. 5. Multimedia objects may include: video clips, audio clips, a graphics segments, and text. Multimedia objects like this are well known. These multimedia objects are just among the many objects that may be imbedded in a question template as described above.

FIG. 4 shows one preferred embodiment of a question template 400 that is displayed to the author 150 when creating and/or modifying a question node 216 in the QA directed graph 200. In one embodiment the author 150 is prompted with a question in order to define what type (multiple choice, true/false, etc.) of question the question node 216 is to contain. In alternative embodiments, this question type can be determined by an answer that the author 150 provides in a field 405 on the question template. The type of question 405 selected by the author 150 need not effect the format of the question template 400. In one embodiment, a space 410 is provided to the author 150 called a question text box 410. The author inputs any question to be asked in the question node 216 into the question text box 410. A button 420 is provided on the question template 400 for adding a multimedia story. This button 420 might have a "+" marking. If there is at least one multimedia story object in the template, there is a "–" button 420A next to the + button for removing a multimedia story object. Adding a story can be done by accessing the story from the knowledge base 145 and pressing the "+" button to add the story to the template. A list of the stories in the template is presented in space 425 of the template. One of the stories in the template can be removed by accessing the story, e.g., clicking on the story identifier in space 425, and pressing the delete "–" button 420A.

In a similar manner, buttons (430, 430A) are included to add or delete conditions under which the question 410 is asked by the system 100. Conditions included in the template 400 are displayed in space 435. In like manner, conditions whose absence cause the system 100 to ask the question 410 can be presented in the space 445. The conditions are defined by the author or alternatively can be accessed in a generic form from the knowledge base 145 and customized by the author 150 in area 435, 445. For example, the conditions are a set of premises P1, P2, etc. (see premises 1420 of FIG. 14) that must be satisfied in order for one or more questions to be asked (or not asked.) The conditions and premises can be presented to the author in spaces 435 and 445 of the question template where the author can change the conditions/premises using standard programming techniques. Buttons to add 440 or delete 440A these conditions are provided. Further, procedures included in the template 400 are displayed in area 455 and are added 450 or deleted 450A by the associated buttons. A procedure is a special function that might be installed by the author 150 to solicit information from the service user 155. For instance, a picture of a thermometer may be presented to the service user 155 at run time in order to solicit a temperature input from the service user 155.

A "shuffle" button 460 permits the author 150 to order the answers to the question that are possible. (These answers are in answer nodes 214 that are children to this question node.) All of the possible answers are displayed in area 465 of the template. Ordering might be determined by weights given to the answers by the author 150 with respect to the question 410. For example, some medical questions that need to be asked of a service user 155 (patient) first might be given a higher weight by the author.

Other buttons on the template 400 perform other functions. The "see button" 472 allows the author to prereview the question and the possible answers included in the template. The "start button" 482 allows the author to run the QA system 100 starting this particular question 410. (See FIG. 12 description.) "Help" 476 and "save" 478 features are provided. A "done function" 480 permits the author to leave this template 400 and possibly return to the QA graph 200.

FIG. 5 is a block diagram of one preferred data set (310, 500) for a question node. The author 150 uses the question template 400 to add, delete, and/or modify information in this data set 500 for each question node 216. Field 505 of the question data structure 500 relates to question type. (See field 405 on question template 400.) These types 505 included multiple choice, single choice, and special question types. Field 510 includes the text of the question 410 inputted by the author 150 at authoring time and to be asked of the service user 155 at run time. Field 520 contains the possible answers to the question 410, 510. In a preferred embodiment, the field(s) 520 contains one or more pointers 523 (these are pointers 360 described in FIG. 3) pointing to one or more child nodes 525. (Child nodes 525 are the answer nodes connected to the question node associated with template 400. These child nodes are the nodes next to the question 400 node 216 on a path directed from the question 400 node 216 to the answer 214 child node 525.) Field 530 includes the names of (or pointers 533 to) the multimedia story(ies), object(s), or document(s) 535 that the author provides to the question template 400 in space 425 and that will help the user to answer this question 410 at run time. Field 540 contains the names of conditions (or pointers 543 to conditions 545). These conditions 545 are defined by functions 430, 430A, and 435, as described in FIG. 4. In one preferred embodiment, the conditions 545 are Boolean variables to be evaluated true for this question to be asked of the user. Field 550 includes names of absent conditions 555 (or pointers 553 to absent conditions 555). These conditions 555 are defined by functions 440, 440A, and 445 as described in FIG. 4. In a preferred embodiment, these conditions 555 are boolean variables 555 which are to be evaluated false for this question 410 to be asked. In a preferred embodiment, field 560 includes pointers 563 (see also pointers 360 in FIG. 3) that point to a set of one or more parent answers. These parent answers are in parent answer nodes (also nodes 214 and answer templates 700 below) that are adjacent to the question 410 in this node 216 (template 400) in a direction opposite to that connecting the parent(s) and this node (216, 400) along the path connecting the parent and this node. Field 570 includes the name (or pointer to) one or more special procedures used for the question. An example of a special procedure would be an interactive graphical object, e.g. a thermometer, displayed on the graphical interface used to the service user 155 at run time to input a to get a temperature. Field 580 includes the order of relative importance if there is more than one question asked in the template 400. This ordering dictates the order in which each question is to be asked to the service user 155 at run time.

Figure 6:
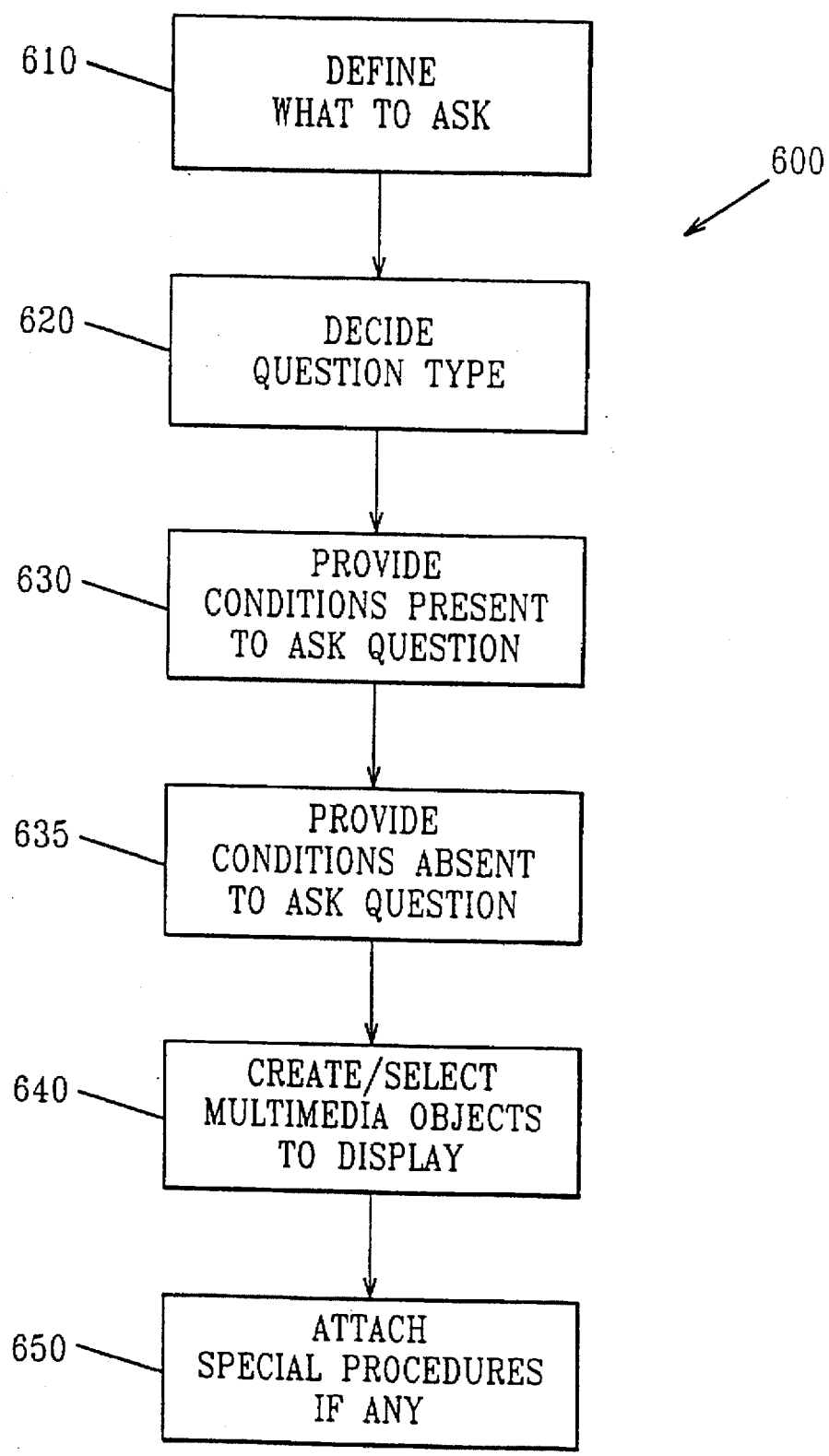
FIG. 6 is a flow chart showing the steps of building a question template data structure.

FIG. 6 is a flow chart 600 describing the steps an author 150 performs using the question template 400 to build a question data set 500.

In step 610, the author 150 decides what to ask in a selected question node 216. The text is then placed in the space 410 on the question template 400. In step 620, the author decides what type of question to use. This information is either solicited from the author 150 prior to the template being presented or is provided by the author in field 405 of the question template 400.

In step 630, the author 150 provides the system 100 with any conditions that must be satisfied before the question 610 is asked. See the description of conditions in FIG. 13 below. The conditions that the author 150 provides will be located in storage area 540.

In step 635, the author 150 provides the system 100 with any conditions whose absence will require that the question 410 (610) of the template 400 will be asked. These conditions 445 will be placed in field 530.

In step 640, the author can provide the system 100 with information (e.g. name, pointer, and/or other references) used to access one or more multimedia objects that can be used to explain the question 410 of the template 400 and/or to explain the answers to the question. This multimedia objects 535 or stories 535 typically are stored on the memory storage 140. The multimedia objects (stories) 535 access information would be stored in field 530.

In step 650, the author 150 can provide or provide information to reference any special procedure that is associated with the question 410 of the template 400. A special procedure example might be a graphical screen specially designed to solicit information from a service user 155.

A non limiting example is now presented showing how an author 150 might use the present system to design a question to author a medical application.

In step 610, the author 150 defines what to ask and in step 620 the author decides what type of question to ask. For example, the question might be "What are your symptoms?" 610 and the question type would be multiple choice 620. The question would only be asked if the service user answer "No" to a prior question "Do you feel well?" in order to satisfy the conditions in step 630. There are no absent conditions 635. The author 150 selects a multimedia video clip from the knowledge base 145 that shows a doctor explaining what a symptom is (step 640). No procedure is selected.

In another non limiting example, the author 150 authors a teaching/training knowledge base. In this case, the author 150 might ask 610 "Do you want to review the history lesson on renaissance art?". This question is of the "Yes/No" type 620. A condition present 630 to ask the question is that the service user/student 155 did not have a passing grade recorded in the system for this lesson. A condition absent 635 prerequisite for asking the question is that the service user/student 155 did not yet run the lesson at run time. A multimedia object 640 might be a video clip displayed summarizing what will be taught in the lesson and the time periods (e.g. years 1490 to 1550) covered by the lesson. The author might select a time line as a special procedure 650 that the service user/student 155 can use to specify (by pointing and clicking with a mouse 122) a part of the lesson covering a specific time period (e.g. years 1495 to 1505).

FIG. 7 shows one preferred embodiment of an answer template 700 that is displayed to the author 150 when creating and/or modifying a answer node 214 in the QA directed graph 200. In one embodiment the author 150 is prompted to answer with an answer or answers to question node 216 immediately prior on its path 230. In alternative embodiments, the author 150 provides the answer in an answer text box 710 on the answer template 700.

A button 720 is provided on the answer template 700 for adding a multimedia story. This button 720 might have a "+" marking. If there is at least one multimedia story object in the template, there is a "−" button 720A next to the button 720 for removing a multimedia story object. Adding a story can be done by accessing the story from the knowledge base 145 and pressing the "+" button 720 to add the story to the template. A list of one or more stories in the template is presented in space 725 of the template 700. One of the stories in the template can be removed by accessing the story, e.g., clicking on the story identifier in space 725 and pressing the delete "−" button 720A.

In an alternative preferred embodiment, only one button 722 is provided. If no stories 725 have been selected, button 722 can shown as a "+" button so that a multimedia story accessed from the knowledge base 145 can be added by clicking the button 722. If there are one or more stories associated with the answer 710, the button 722 can be shown as a "−" so that one of these stories can be removed after access by clicking on the button 722.

Note that a story here can be a group of stories, or hyperstory as defined in U.S. patent application Ser. No. 08/127,863 to Kim filed on Sep. 27, 1993 which is herein incorporated by reference.

In block 712 a space is provided to add follow up questions (see 820, 823, and 825 of FIG. 8) to the answer 710. In one preferred embodiment, the author 150 is referred to the QA directed graph 200 in a previous screen where the author 150 can provide additional question nodes (825) as children to the answer node 710.

In block 714, the author 150 is given an opportunity to add 720, edit, or remove 720A an explanatory story for the answer. For example, if the author 150 wishes to present the service user 155 of a medical system 100 an explanation of the answer "deep cough" 710 (one multiple choice answer to the question "What are your symptoms?"), the author 150 might access a video clip showing someone with a deep cough and add the clip to the answer template 700 by pressing button 720.

The author 150 can provide a weight to the answer 710 by using the weight function 730, e.g. a slider button (like a procedure) or list of weights provided and selected by a mouse click. By using this function the author 150 can change and select the weight of the answer 710. By weighting the answers, the author 150 can specify preferences in paths 230 of the QA directed graph 200 during execution at run time.

A global effect function 740 is provided to the author 150, typically with a button 740. By pressing this button 740 the author 150 can provide "global effects" to the system 100. A global effect causes one or more of the question nodes in the QA directed graph 200 to be enabled or disabled at run time. Therefore, at run time, if a question node on a path is reached and is enabled, it will be presented to the service user 155. However, if the question node is disable, it will not be presented to the service user 155. This can be accomplished by using the answers provided by a service user 155 at run time to provide values to premises (1420 in FIG. 14) of conditions. If all the premises of the condition are met, the condition may disable one or more question nodes. See blocks 540 and 550 in FIG. 5.

Other buttons on the template 700 perform other functions. The "see button" 772 allows the author to prereview the corresponding question 410 (prior on the path 230). The see button 772 can also permit the author to view alternative answers 710 to the question 410.

A play button 784 permits the author 150 to preview one or more multimedia stories associated with the answer 710 by functions 720 and 720A.

The edit button 786 permits the author 150 to edit any of the selected multimedia stories. For example, by using known tools in Smalltalk, a multimedia story accessed from the knowledge base 145 can be edited once the author presses the edit button 786.

"Help" 776 and "save" 778 features are provided. A "done function" 780 permits the author to leave this template 700, e.g. to return to the QA graph 200.

FIG. 8 is a block diagram of one preferred data set 800 for an answer node 214. The author 150 uses the answer template 700 to add, delete, and/or modify information in this data set 800 for each answer node 214.

Field 810 includes the text of the answer 710 inputted by the author 150 at authoring time and to be provide to service user 155 for selection at run time.

Field 820 contains the possible follow up questions to the answer 710, 810. In a preferred embodiment, the field(s) 820 contains one or more pointers 823 (these are pointers 360 described in FIG. 3) pointing to one or more child nodes 825.

Child nodes 825 are the question nodes connected to the answer node associated with template 700. These child nodes 825 are the nodes next to the answer 700 node 214 on a path directed from the answer 700 node 214 to the question 216 child node 825.

Field 830 includes the names (or pointers 833 to) the multimedia story(ies), hyperstories, object(s), or document (s) 835 that the author provides to the answer template 700 in space 725 and that will help the service user 155 to understand this answer 710 at run time.

Field 840 contains the global effects 740 as conditional statements that enable or disable certain question nodes in the QA directed graph 200. At run time, these global effects will also disable all answer nodes that are children of the disabled question node when they are accessed through the disabled question node.

Field 850 contains the value of the weight selected by the author 150 in the description of function 730. This weight is used by the system 100 at run time to show the service user 155 answers 710 and associated children and explanations in an order of preference. For example at run time, answers 710 with a higher weight will be presented to the service user 155 before answers of a lower weight.

In a preferred embodiment, field 860 includes pointers 863 (see also pointers 360 in FIG. 3) that point to a set of one or more parent questions. These parent questions are in parent question nodes 865 (also nodes 216 and question templates 400 above) that are adjacent to the answer 710 in this node 214 (template 700) in a direction opposite to that connecting the parent(s) and this node (214, 700) along the path connecting the parent and this node.

FIG. 9 is a flow chart 900 describing the steps an author 150 performs using the answer template 700 to build a answer data set 800.

In step 910, the author 150 decides what to respond in a selected answer node 214. The text is then placed in the space 710 on the question template 700. In step 920, the author 150 creates multimedia explanations of the answer 710. The author can do this by accessing a multimedia object from the knowledge base 145 and then selecting it by pressing button 720 (722).

In step 930, the author 150 enters the value of the answer 710 weight 730 in field 850 by selecting from an list of numbers in function 730. Alternative embodiments are within the contemplation of the inventor.

In step 940, the author 150 enters conditional statements that will be the global effects associated with the answer.

The two non limiting examples above for a medical and educational system 100 will now be continued.

In the medical example, three answers (710, 910) to the multiple choice question 410 selected (610 and 620) might be "deep cough", "fever", and "sore throat." The author might choose a multimedia explanation 920 of the answer "deep cough." This might be a video clip of a person with a deep cough that is accessed from the knowledge base 145 and added to the answer template 700 as stated above. The author might select weights 930 for each of the answers, e.g., assigning a weight of 9 to "deep cough", 5 to "fever", and 2 to "sore throat." By doing this, the author 150 might be specifying that the answer "deep cough", its explanations, and any associated follow up questions, would be presented to a service user 155 first at run time. Then the answer "fever" would be presented followed by "sore throat."

In the teaching example, the answer 910 to the question 410 "Do you want to review the history lesson on renaissance art?" will be either "Yes" or "No." Neither a multimedia explanation 920 or a answer weight 930 would be selected.

FIG. 10 is a flow chart 1000 showing the steps that an author uses in building (authoring) a knowledge based system using the built question and answer data structures described above.

In a preferred embodiment, the authoring process begins with the author 150 building a question 1010 (node 216) using a question template 400 that is used by the author to populate the associated question data structure 500 as described above. In like manner the author 150 builds answers 1020 (nodes 214) using answer templates 700 to populate the associated answer data structures 800. The answers are children of the question. By inspection of the QA directed graph 200, it is noted that more than one answer node 214 can be a child of a question node 216. After the answer nodes are complete 1020, the questions nodes 216 that are children of the answer nodes 214 are then built (see return 1025).

Figure 11:
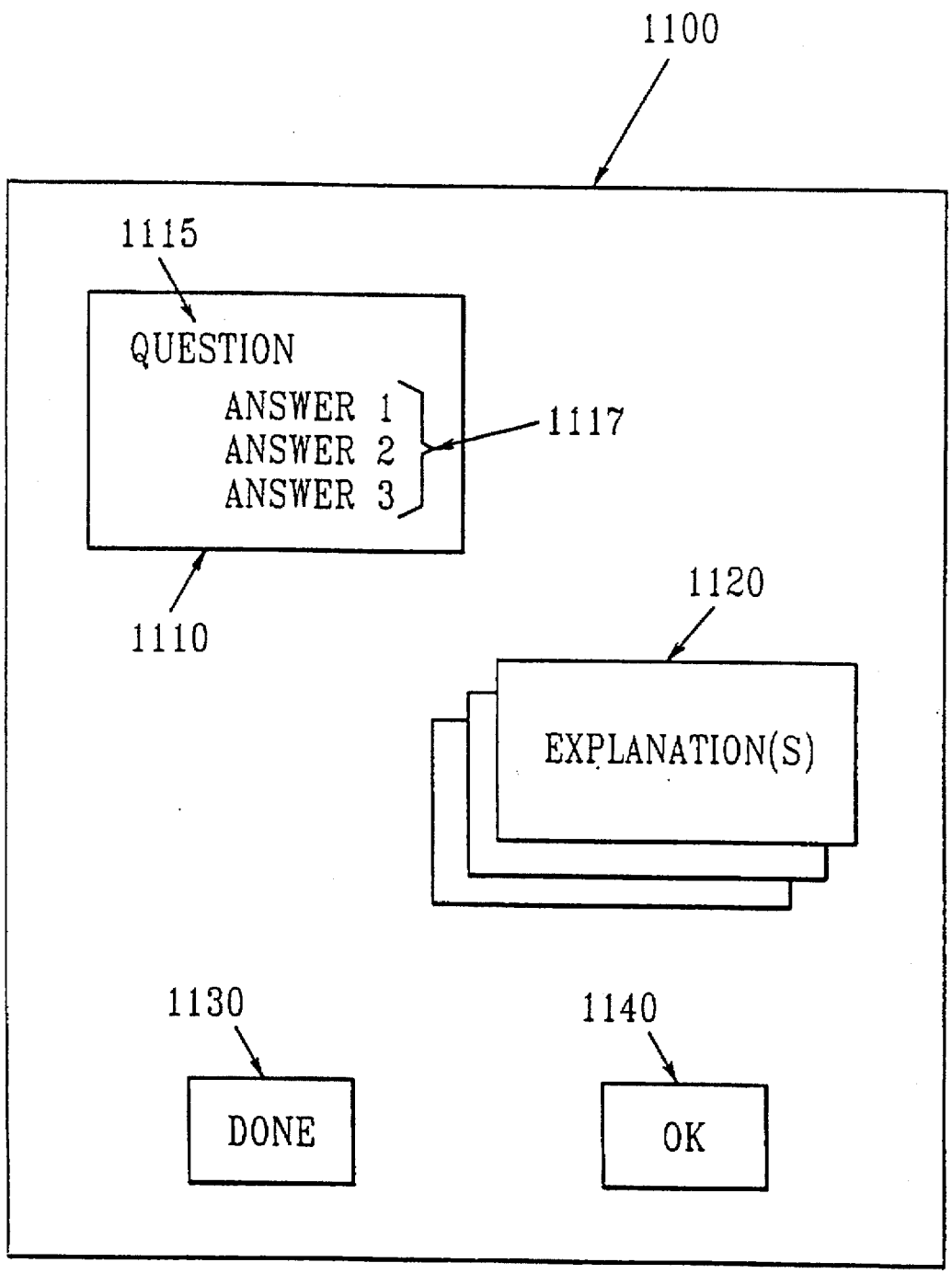
FIG. 11 is a block diagram of one preferred screen layout during run time.

In addition to building question and answer nodes, the author is enabled to design a screen layout 1030 that is presented to the service user 155 at run time. Using the window functions in Smalltalk the author can position and resize windows and/or buttons on the run time screen. For example, FIG. 11 shows a run time screen 1100 with a window 1110 that displays the question 1115 of a question node and the possible answers 1117 that are the child nodes of the question. Box 1120 permits the service user to access an explanation(s) of the question (answers) the information, preferably multimedia stories defined in the data structures 530 (830). The Done button 1130 allows the service user 155 to exit from the program. The OK button 1140 allows the service user 155 to move on to the next question. Note that the buttons on the display 1100 are just windows defined as buttons.

In step 1040, the author 150 runs the system starting at a given question node. If the system does not suit the author 150, the author iterates 1045 to add/delete/modify the question and answer nodes of the QA graph the author is constructing. Running the system is described in FIG. 12.

Figure 12:
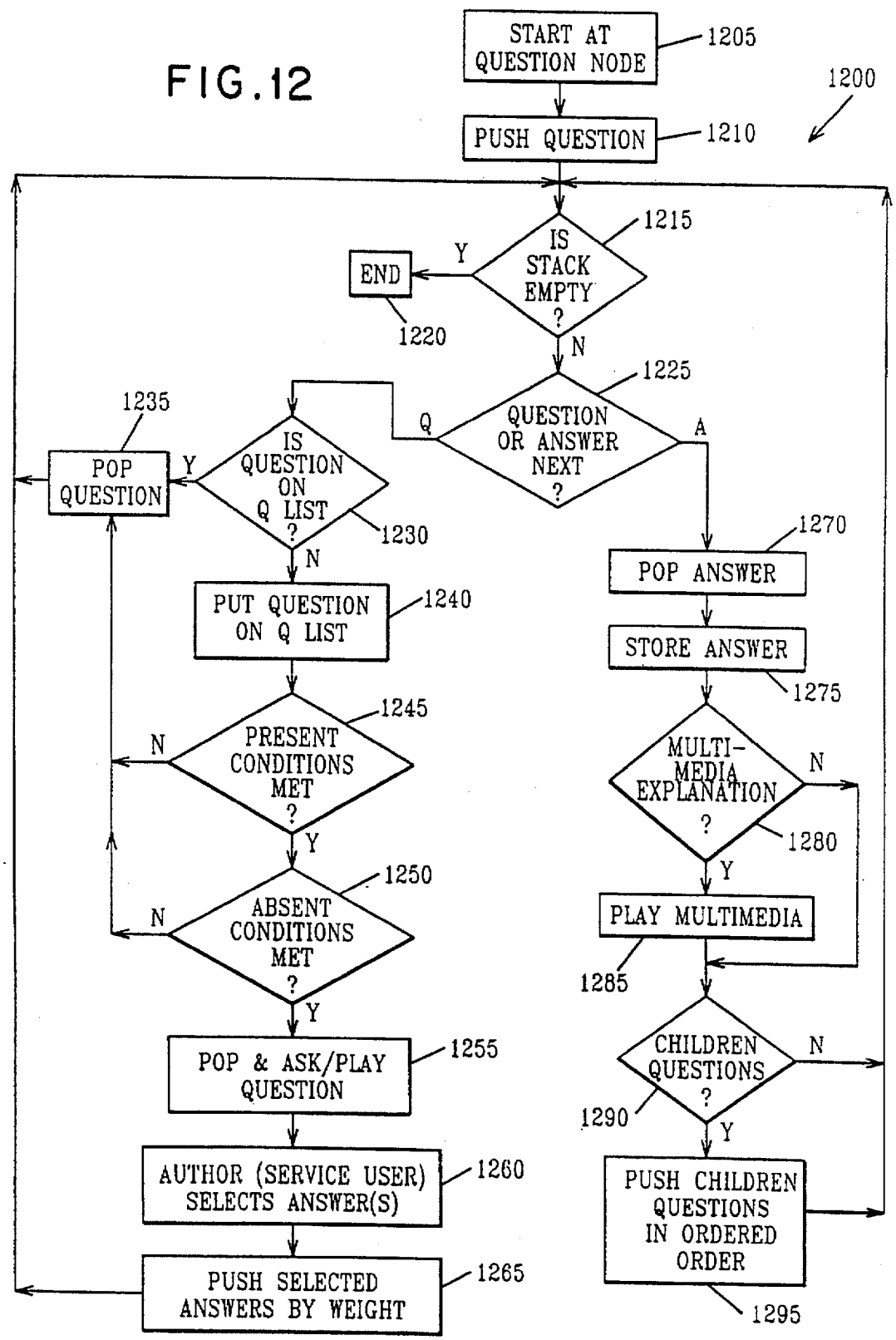
FIG. 12 is a flow chart of a run time/run system algorithm.

FIG. 12 is a flow chart of an algorithm 1200 showing the steps of running during run time, the system created (or partially created) at authoring time, i.e. the "run system" mode of step 1040. Typically the system 100 is run at run time for a service user 155. In this case, the algorithm 1200 will begin at the first question node, Q1, in the QA directed graph 200. Alternatively, the system can be run by the author 150 in the "run system" mode of step 1040 to "debug" the system or access the performance of the system. Typically, the author 150 can choose any question node 216 in the QA directed graph 200 (including Q1) to begin the execution of the algorithm 1200.

The algorithm 1200 starts by selecting 1205 a question node 216 on the QA graph 200. This can be done by any well known means, e.g., pointing and selecting the question node 216 with a mouse 123. If the entire system is to be run at run time, the starting question node would be Q1. Alternatively, the system 100 can start running along a given path 230 of the QA graph 200 by starting at a question node (e.g. Q31) along the path 230.

Figure 13A:
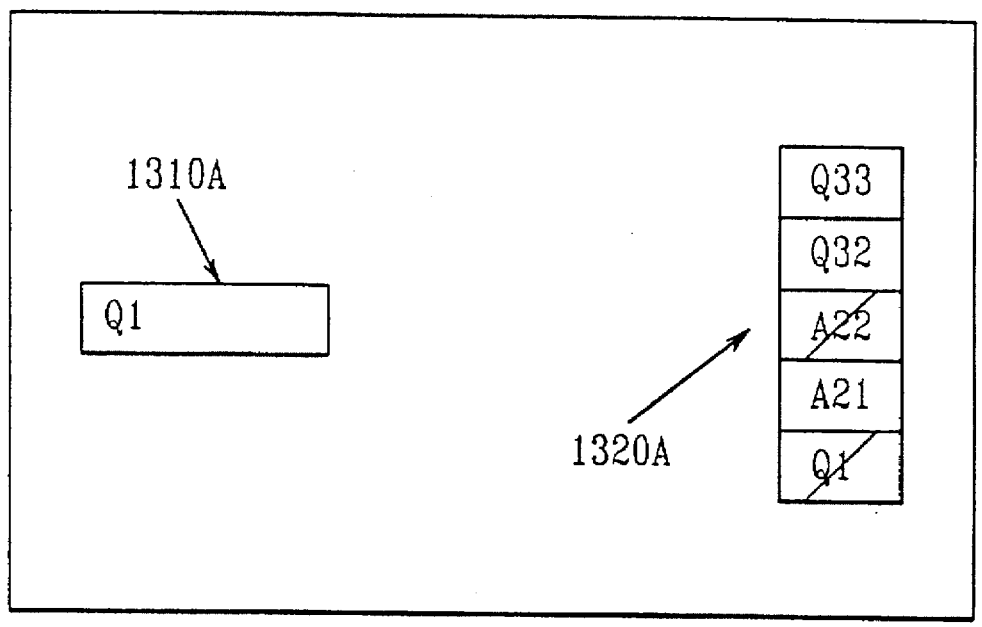
FIG. 13, comprises FIGS. 13A through 13D, showing a block diagram of a question list (Q-list) and a stack at various times during the execution of the run time/run system algorithm.
Figure 13B:
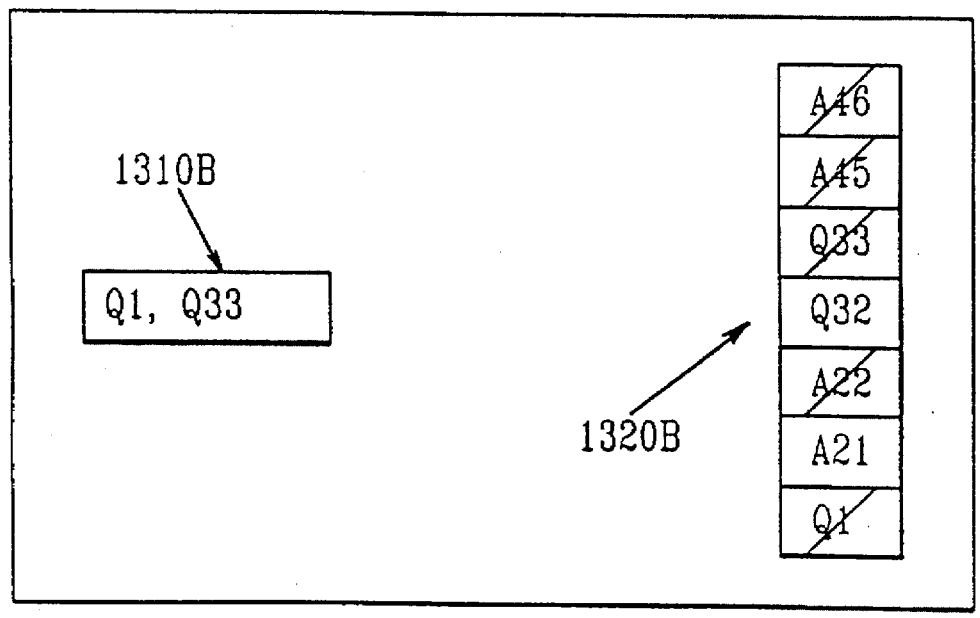
Figure 13C:
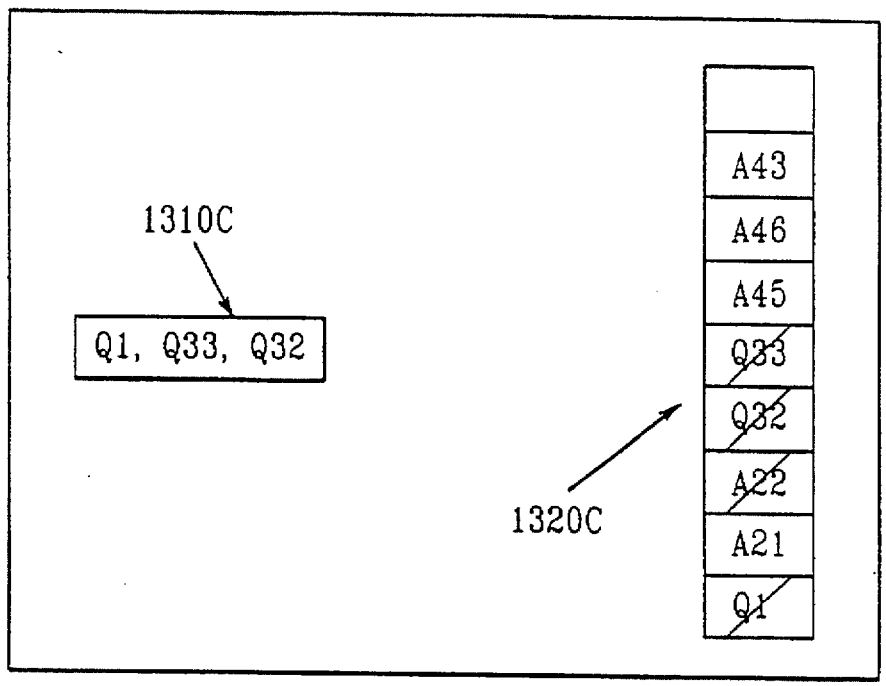
Figure 13D:
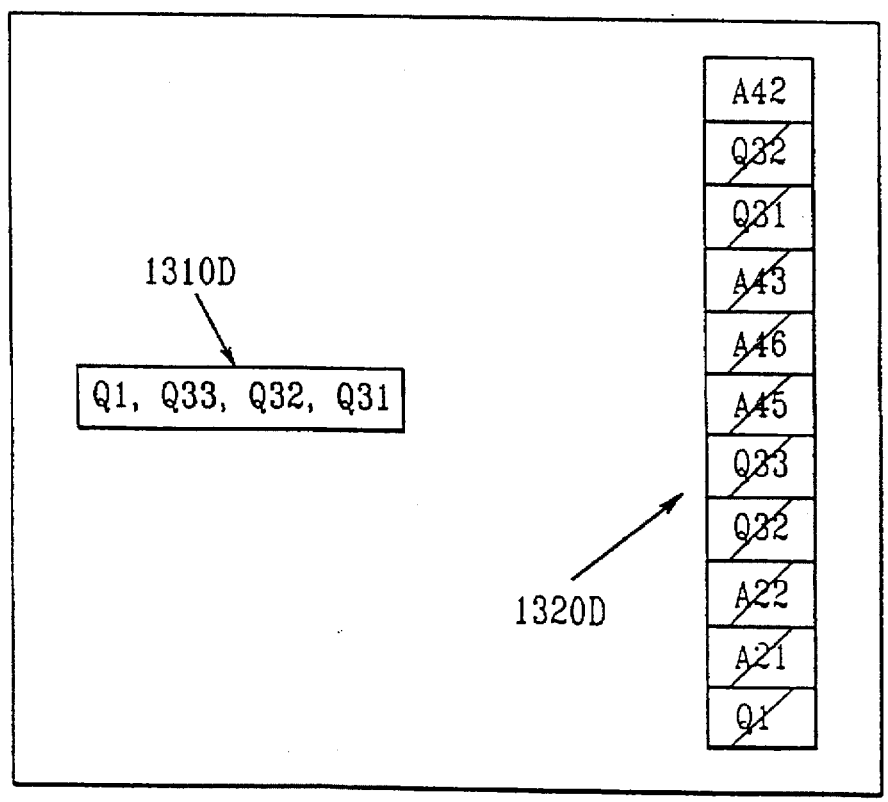

Two data structures are used during run time (or running the system in step 1040). They are a question list (Q-list) and a stack. FIG. 13A is a block diagram of a Q list and FIG. 13B is a block diagram of a stack.

In step 1210, the selected question node, i.e., an identifier representing or pointing to the selected question node, is pushed on to the stack. When an item is pushed on the stack, it is placed "on top" of the stack so that it will be the first item accessed when the stack is next referenced. This pushed question node is the node selected in step 1205 when the system 100 starts to run. Steps 1205 and 1210 initialized the algorithm 1200.

Once the algorithm 1200 is initialized, a check is made 1215 to determine if the stack is empty. If the stack is empty, the algorithm 1200 ends 1220. However, if the stack is not empty, the algorithm 1200 checks whether the next item in the stack is a question node 216 (i.e. a question asked by the node) or and answer node 214 (i.e., an answer answered by the node) 1225.

If the next item in the stack is a question, the algorithm 1200 determines if the question is on the Q list 1230. If the question is not on the Q list, the algorithm 1200 places the question (i.e., the representation or pointer to the respective question node 216) on the Q list 1240. If the question is on the Q list in step 1230, the question is popped off 1235 and the algorithm 1200 returns to step 1215. When an item is "popped" off the stack, it is erased or removed. After the question is placed on the Q list in step 1240, a check is made to determine if the present conditions associated with the question are met 1245. These are conditions 545 in FIG. 5. If the present conditions 545 are not met, the question is popped off the stack 1235 and the algorithm 1200 returns to step 1215.

If the present conditions 545 are met (or there are no present conditions), a check is made to determine whether the absent conditions associated with this question are met 1250. These absent conditions are the conditions 555 in FIG. 5. If the absent conditions are not met, the question is popped off the stack and the algorithm 1200 returns to step 1215.

However, if the absent conditions 555 are met (or there are no absent conditions), the question is popped off the stack and also played 1255. Playing means that the question is presented to the service user at run time (or author during step 1040) because all conditions (present 545 and absent 555) for asking the question were met. For example, playing a question could mean presenting a window (block 1110 of FIG. 11) with the question associated with the node presented. This question is the question 410 authored (and block 510 of FIG. 5) for the question node 216 by the author 150 at authoring time. The possible answers to this question (block 465 in FIG. 4 and/or the answer children 520 in FIG. 5) can also be displayed in the window 1110. Playing can also mean choosing a window at run time to display an explanatory story 1120 that plays along with the question window 1110. The explanatory story 1120 can be any multimedia object and can be specified by the author 150 at authoring time in block 425 of FIG. 4.

Once the Question 1115, the associated answers 1117, and/or explanation 1120 has been presented to the service user 155, the service user 155, selects one or more of the associated (children answers 520, 525) answers presented 1110 at run time. The answers that are selected by the service user 155 are then pushed on the stack in step 1265. "Pushing" on the stack means that they are added to the stack memory in an order. In one preferred embodiment, the answers are placed on the stack so that the last answer placed on the stack is the first one out of the stack. In another preferred embodiment, the answers (if there are more than one) are placed on the stack in a weighted order. In a still more preferred embodiment, the weighted order is such that the answers with higher weights are popped off the stack before answers with lower weights. Therefore, all the answers (children answers 520, 525) associated with a given question 510 are ordered so that the answer (520, 525) of highest the weight is popped from the stack first, then the answer (520, 525) associated with the question 510 with the next highest weight, then the next highest weight, etc. The weight of any answer is assigned by the author 150 at authoring time by providing a weighting value (850 in FIG. 8).

Once all the (children) answers (520, 525) of a question that are selected by the service user 155 at run time have been pushed on to the stack, the algorithm 1200 returns to decision block 1215. If the stack is not empty 1215, the algorithm 1200 then determines 1225 whether or not the next entry on the stack is a question or an answer 1225.

If the next entry in the stack is an answer, the answer is popped from the stack 1270, i.e., the answer is removed/erased from the stack.

In addition to popping the answer from the stack 1270, the answer is stored 1275. The value of the answer is stored as one or more premise values 1420 in a condition 1401. See FIG. 14. These conditions are used to determine the criteria (540, 550) for asking/playing question to a service user 155 at run time.

In addition to the answer being stored 1275, the algorithm 1200 determines whether there is a multimedia explanation associated with the popped answer 1280. If there is a multimedia explanation, the multimedia explanation is played 1285 by presenting the multimedia explanation for the answer to the service user 155/author 150 (during the run system step 1040). The multimedia explanation can be played 1285 in the explanation block 1120. The algorithm 1200 then goes to decision block 1290.

If there is no multimedia explanation for the answer in decision block 1280, the algorithm goes to decision block 1290. No multimedia explanation is played. In decision block 1290, the algorithm 1200 determines whether there are any follow up (children) questions (820, 823, 825) for the answer 810. If there are not, the algorithm 1200 returns to block 1215. If there are, the algorithm 1200 pushes the children questions (820, 823, 825) on to the stack.

In block 1295, the follow up (children) questions (820, 823,825) of an answer 810 are placed on the stack in the order encountered. In a more preferred embodiment, the questions are placed on the stack 1295 in an order of importance. This order can be determined by the author 150 at authoring time by providing the order of importance in the question information block 580. In one preferred embodiment, the author 150 provides the order of importance for questions by selecting the order of follow up questions on the answer template 700 by using a shuffle button 745. The shuffle button 745 permits the author 150 to reorder follow up questions to the answer associated with the answer template 700. This order is stored in question information block 580. (Note that if an answer is at the end of a path, there will be no follow up questions and the shuffle button 745 need not be presented to the author 150.) Once all the follow up questions associated with an answer are placed on the stack, the algorithm returns to decision block 1215.

FIG. 13 is a block diagram of a Q-list 1310 and a stack 1320 shown in an illustrative example at various times (FIGS. 13A–13D) during the execution of the run time/run system algorithm 1200. The Q-list 1310 and stack 1320 are memory locations in the computer 105 or memory storage 140. In FIG. 13, questions and answers that have been pushed on the stack will be shown in their order on the stack where the entry on the top of the stack is the next entry to be popped. Entries that have been placed on the stack and have been popped are shown as crossed out. The stack 1320 (A, B, C, and D) shows the order of processing performed by the algorithm 1200 on the question 216 and answer 214 nodes. The Q-list 1310 (A, B, C and D) is a listing of questions already asked/played, i.e., presented to the author 150 or service user 155. Questions asked once are placed on the Q-list and not asked again.

In this non limiting illustrative example, execution of the algorithm 1200 is assumed to begin at question node Q1 of the QA directed graph 100. In step 1205, 1210, 1215, and 1225, question node Q1 (or its representation) is popped on the stack and it is determined that the next node on the stack is a question. Since the question, Q1, is not on the Q-list 1230, it is put on the Q-list (1310A) in step 1240 and assuming the present and absent conditions are met (1245, 1250), the question Q1 is popped 1255 (crossed out in stack 1320A) and asked by being played to the author 150/service user 155. In this example it is assumed that the author 150/service user 155 selects 1260 only answers A21 and A22 and that answer A22 has a higher weight 850. Therefore, answers A21 and A22 are pushed on the stack 1320A in step 1265 with answer A22 pushed last (first out).

As the algorithm returns to decision blocks 1215 and 1225 it determines that answer A22 should be popped 1270 and stored 1275. (See crossed out A22 in block 1320A.) If there was a multimedia explanation 1280 associated with the answer A22, the explanation (830, 833, 835) will be played 1285 and then any children questions of answer A22 are determined 1290. If there are no multimedia explanations 1280, the children questions (820, 823,825) are determined 1290.

In block 1295, the children questions of answer A22 are pushed on the stack 1320A in order of importance 580. In FIG. 13A, question Q33 is considered of higher importance 580 because it is placed above question Q32 in the stack 1320A. The algorithm 1200 returns to decision block 1215 and it is determined 1225 that the next item in the stack is a question Q33.

A check 1230 is made to determine if question Q33 is on the Q-list. This determines whether question Q33 has already been asked. It is not, so it is placed 1240 on the Q-list 1310B. Assuming that the present 1245 and absent 1250 conditions are met for the question Q33, the question is popped (see crossed out question Q33 on stack 1320B) and asked/played 1255. The author 150 or service user 155 then selects the children answers (520, 523, 525) associated with question Q33. Here it is assumed that answers A45 and A46 are chosen. These answers are pushed 1265 on to the stack in a weighted 850 order. In this example, it is assumed that answer A46 has a higher weight than answer A45 because it is placed higher (first out) of the stack 1320B.

The algorithm 1200 returns to block 1215 and determines that an answer 1225 is next in the stack 1320B. The next out answer, A46 is popped 1270 (see A46 crossed out in 1320B), stored 1275, and explained by a multimedia explanation (1280, 1285) if specified. Since there are no children questions for answer A46, the algorithm 1200 returns to decision block 1215.

In block 1225 it is determined that answer A45 is next in the stack 1320B. Answer A45 is popped 1270 (see A45 crossed out in 1320B), stored 1275, and explained by a multimedia explanation (1280, 1285) if specified. Since there are no children questions for answer A45, the algorithm 1200 returns to decision block 1215.

In block 1225 it is determined that the next entry in the top of the stack 1320B is question Q23. A check is made of the Q-list 1310B to determine if question Q23 has been asked. Since it has not been asked, question Q23 is placed 1240 on the Q-list 1310C. Assuming that the present 1245 and absent 1250 conditions are met, question Q32 is popped (see crossed out Q32 in FIG. 13C) and asked/played 1255. The author 150 or service user 155 than selects one or more of the children answers (520, 523, 525) of question Q32. Assuming only answer A43 is selected, it is pushed 1265 on the stack 1320C. Since there is only one answer pushed, the answer weight does not affect the answer position in the stack 1320C.

The algorithm 1200 returns to decision block 1215 and answer A43 is determined 1225. Answer A43 is processed in steps 1270 (see crossed out A43 in stack 1320D), 1275, 1280, 1285, 1290, and 1295 as described above. Since answer A43 has no children questions, no new questions are pushed on the stack.

The algorithm 1200 returns to decision block 1215 and answer A21 is determined 1225. Answer A21 is processed in steps 1270 (see crossed out answer A21 in stack 1320D), 1275, 1280, 1285, 1290, and 1295 as described above. Since answer A43 has children questions Q31 and Q32, they are placed 1295 on the stack in order of importance 580. Here Q32 is considered more important (first out) than Q31.

The algorithm 1200 returns to decision block 1215 and determines 1225 that question Q32 is the next entry in the stack 1320D. Since question Q32 is on the Q-list 1310D, it is popped 1235 (see crossed out Q32 in the stack 1320D) and the algorithm 1200 returns to decision block 1215. It is determined 1225 that the remaining entry in the stack at this time is question Q31. Since question Q31 is not on the Q-list 1310C, it is put 1240 on the Q-list 1310D. Assuming the present 1245 and absent 1250 conditions are met for question Q31, the question Q31 is popped (see crossed out question Q31 in stack 1320D) and asked/played 1255. The author 150 or service user 155 selects 1260 one or more children answers for question Q31 and that selected answer (here assume answer A42) is pushed 1265 on the stack 1320D.

When the algorithm 1200 returns to decision blocks 1215 and 1225 it is determined that answer A42 is the remaining entry in the stack 1320D. Answer A42 is processed in steps 1270, 1275, 1280, and 1285 as describe above. Since answer A42 has no children questions 1290 the algorithm 1200 returns to decision block 1215.

Since the stack 1320 is now empty, the algorithm 1200 ends 1220.

Figure 14:
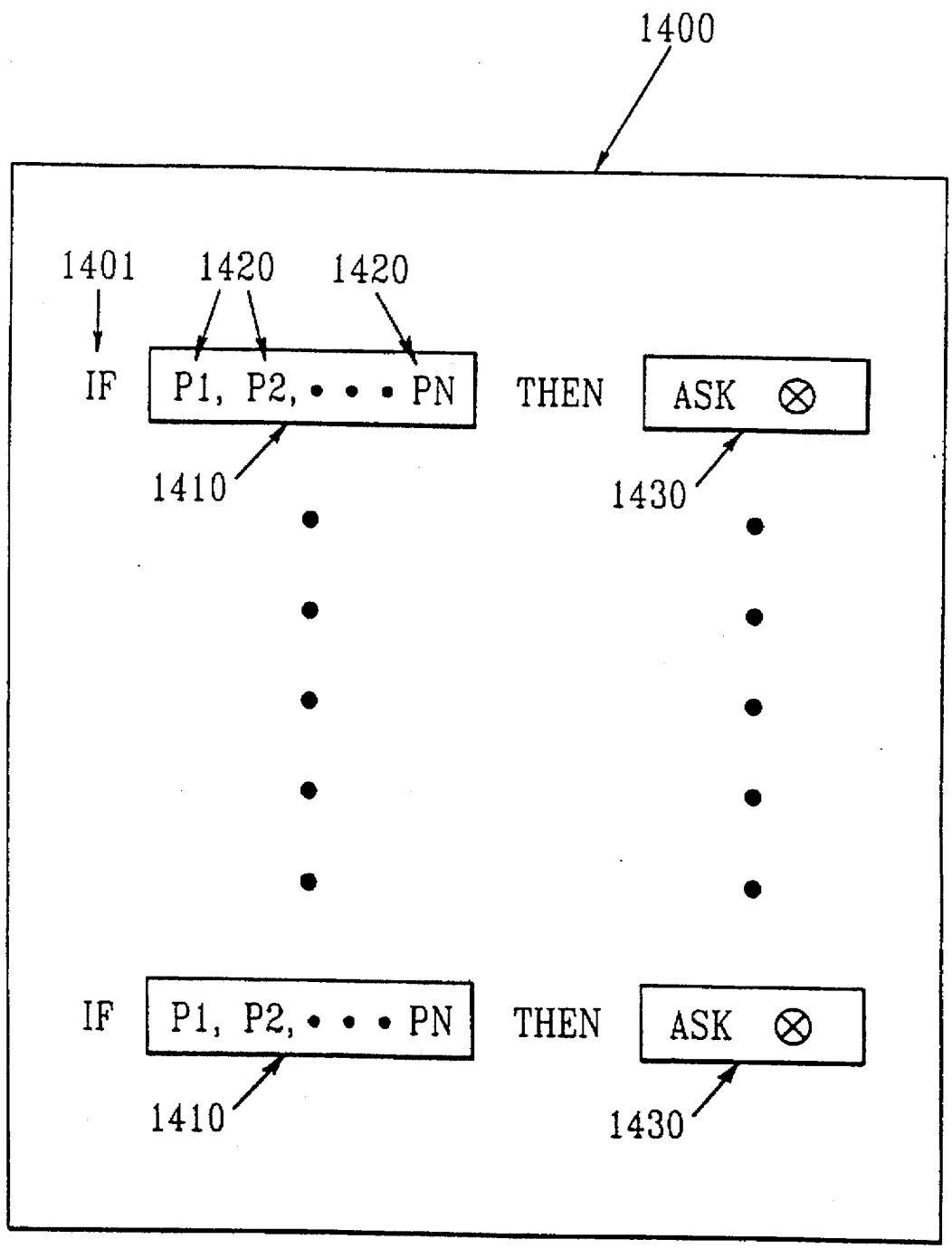
FIG. 14 a block diagram showing one preferred condition data structure with premises using answers as values.

FIG. 14 is a block diagram showing the structure of a typical condition 1401 in a set of conditions 1400. Premises (P1, P2, through PN) 1420 are used by the conditions to determine if a question 1430 is to be (or not to be) played. These conditions are used as specified in FIG. 5 (540, 550) as conditions present and conditions absent in the question nodes.

The conditions 1400 are a set 1410 of one or more premises 1420 that are satisfied before an question is asked (not asked) 1430. In this case, the premises are the values (typically 1420) of the answers that are stored (step 1275) in the system 100 memory.

One preferred embodiment of the invention has been implemented in Smalltalk/OS2 and used to build Guardian, a home health-care consulting system for families with children with leukemia. This system models physician-patient interactions regarding the symptoms related to leukemia. It asks a series of questions about the symptoms or problems the patient might be experiencing, and interprets the answers in the context of the history of the patient and of the current state of the patient's condition. As the dialog between Guardian and the patient proceeds, Guardian provides the patient with a variety of information such as what the patient can do, what to watch out for, and what might be causing the problems. Guardian makes extensive use of multi-media objects such as video clips, audio clips, images, text to provide the explanation and guidance to the patient. One skilled in the art given this disclosure could build many other medical (knowledge based) embodiments that are within the contemplation of the inventor.

In another preferred embodiment, the system 100 is used to create a multimedia knowledge base 145 that is used in preparing lessons and/or training programs. These programs can be used in educational settings and/or in corporate training programs.

Using system 100 an author 150 can address any general class of problems where domain knowledge can be captured as a set of guided questions and answers. The present invention provides opportunities for the majority of those authors 150 ("experts"), whose expertise may otherwise go unnoticed, to realize what they know into useful knowledge-based systems. Their are many uses and embodiments of this invention that would be evident to one skilled in the art given this disclosure that are within the contemplation of the inventor. For example, the author 150 might create a knowledge-base dealing education or training information (including corporate procedures, a teacher's lesson, or any other information that needs to be conveyed.) The invention can also be used in work places, classrooms, doctor's offices, and in the homes.

I claim:

1. A system for authoring a knowledge based computing system comprising:

a computer with memory storage and a graphical interface;

a knowledge base application installed on the computing system;

a question data structure and an answer data structure stored in the memory storage; and a QA directed graph generated at an authoring time on the graphical interface by said knowledge base application, the directed graph having a plurality of question nodes and a plurality of answer nodes, the question nodes being represented by question templates and the answer nodes being represented by answer templates on the graphical interface, the knowledge base application generating a knowledge data base for the knowledge based computing system using the question data structure and the answer data structure as an author inputs information in the question and answer templates, respectively, the question and answer nodes being connected to one another by the knowledge base application on one or more paths by a link between each one of the question nodes and each of one of the answer nodes so that question nodes and answer nodes alternate as the path is traversed in a path direction, an author accessing one or more of the question nodes and one or more of the answer nodes to provide information to the one or more of the question data structures and answer data structures, respectively, in order to build an application in the knowledge data base to be presented to a service user at a run time.

2. A knowledge based system, as in claim 1, where the author provides information into a question data structure that is an order of importance of a question of the question node.

3. A knowledge based system, as in claim 1, where the author provides information into a question data structure that is one or more conditions that have to be present in order for a question in the question structure to be asked at the run time.

4. A knowledge based system, as in claim 1, where the author provides information into one of the question data structures, the information being one or more conditions that have to be absent in order for a question in the question structure to be asked at the run time.

5. A knowledge based system, as in claim 1, where the author provides information into one of the answer data structures that is a weight of importance of an answer in the answer data structure.

6. A knowledge based system, as in claim 1, where the author provides information into one of the answer data structures, the information being one or more global side effects that prevent the asking of one or more questions at the run time.

7. A knowledge based system, as in claim 1, where one or more of the templates is a multimedia object.

8. A knowledge based system, as in claim 7, where one or more of the question templates permits the author to select one or more question multimedia objects to be shown to the service user at run time.

9. A knowledge based system, as in claim 8, where one or more of the question multimedia objects explains the question associated with one of the question templates.

10. A knowledge based system, as in claim 7, where one or more of the answer templates is a multimedia object permitting the author to select one or more answer multimedia objects to be shown to the service user at run time.

11. A knowledge based system, as in claim 10, where one or more of the answer multimedia objects explains the answer associated with one of the answer templates.

12. A system for authoring a medical knowledge based computing system comprising:

a computer with memory storage and a graphical interface;

a medical knowledge base application installed on the computing system;

a question data structure and an answer data structure stored in the memory storage; and a QA directed graph generated at an authoring time on the graphical interface by said medical knowledge base application, the directed graph having a plurality of question nodes and a plurality of answer nodes, the question nodes being represented by question templates and the answer nodes being represented by answer templates on the graphical interface, the medical knowledge base application generating a medical knowledge data base for the medical knowledge based computing system using the question data structure and the answer data structure as an author inputs information in the question and answer templates, respectively, the question and answer nodes being connected to one another by the medical knowledge base application on one or more paths by a link between each one of the question nodes and each of one of the answer nodes so that question nodes and answer nodes alternate as the path is traversed in a path direction, an author accessing one or more of the question nodes and one or more of the answer nodes to provide information to the one or more of the question data structures and answer data structures, respectively, in order to build a medical application in the medical knowledge data base to be presented to a service user at a run time.

13. A system for authoring a teaching knowledge based computing system comprising:

a computer with memory storage and a graphical interface;

a tutorial knowledge base application installed on the computing system;

a question data structure and an answer data structure stored in the memory storage; and a QA directed graph generated at an authoring time on the graphical interface by said tutorial knowledge base application, the directed graph having a plurality of question nodes and a plurality of answer nodes, the question nodes being represented by question templates and the answer nodes being represented by answer templates on the graphical interface, the tutorial knowledge base application generating a tutorial knowledge data base for the teaching knowledge based computing system using the question data structure and the answer data structure as an author inputs information in the question and answer templates, respectively, the question and answer nodes being connected to one another by the tutorial knowledge base application on one or more paths by a link between each one of the question nodes and each of one of the answer nodes so that question nodes and answer nodes alternate as the path is traversed in a path direction, an author accessing one or more of the question nodes and one or more of the answer nodes to provide information to the one or more of the question data structures and answer data structures, respectively, in order to build a tutorial application in the tutorial knowledge data base to be presented to a service user at a run time.

14. A computer implemented method for authoring a knowledge data base on a knowledge based computing system, comprising the steps of:

storing a question data structure and an answer data structure in computer memory;

generating and displaying on a graphical interface to an author a QA directed graph at an authoring time by a knowledge base application installed on a computer, the QA directed graph having a plurality of question nodes and a plurality of answer nodes, the question nodes being represented by question templates and the answer nodes being represented by answer templates on the graphical interface, generating by the knowledge base application the knowledge data base for the knowledge based computing system using the question data structure and the answer data structure as the author inputs information in the question and answer templates, respectively;

connecting the question and answer nodes to one another by the knowledge base application on one or more paths by a link between one or each of the question nodes and one of each of the answer nodes so that question nodes and answer nodes alternate as the path is traversed in a path direction;

responding to the author selecting one or more of the question nodes on the QA directed graph by the knowledge base application prompting the author to add information to a question data structure by defining a question to ask in the question node;

responding to a selection by the author of one or more of the answer nodes on the QA directed graph by the knowledge base application prompting the author to add information to an answer data structure by defining an answer to a parent question node; and laying out a screen to be displayed on the graphical interface to a service user at a run time, the screen displaying defined questions and defined answers.

15. A method, as in claim 14, where more information is added to the question data structure by:

b (ii). providing conditions present prior to asking the question at the run time.

16. A method, as in claim 14, where more information is added to the question data structure by:

b (ii). providing conditions absent prior to asking the question at the run time.

17. A method, as in claim 14, where more information is added to the question data structure by:

b (ii). selecting one or more multimedia objects for explaining the question at the run time.

18. A method, as in claim 14, where more information is added to the question data structure by:

b (ii). selecting one or more procedures for soliciting information from the service user at the run time.

19. A method, as in claim 14, where more information is added to the question data structure by:

b (ii). defining a question type in the question node.

20. A method, as in claim 14, where more information is added to the answer data structure by:

c (ii). selecting one or more multimedia objects for explaining the answer at the run time.

21. A method, as in claim 14, where more information is added to the answer data structure by:

c (ii). selecting a weight for one or more answers to determine an order of answer presentation at the run time.

22. A method, as in claim 14, where more information is added to the answer data structure by:

c (ii). selecting a global effect for one or more answers to determine if one or more questions are presented at the run time.

* * * * *